United States Patent
Schneider

(10) Patent No.: US 6,309,156 B1
(45) Date of Patent: *Oct. 30, 2001

(54) MOUNTING UNIT AND METHOD OF MAKING SAME

(75) Inventor: Wilhelm Schneider, Rednitzhembach (DE)

(73) Assignee: Richard Bergner GmbH & Co., Schwabach (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/682,739

(22) PCT Filed: Feb. 1, 1995

(86) PCT No.: PCT/EP95/00354

§ 371 Date: Jul. 31, 1996

§ 102(e) Date: Jul. 31, 1996

(87) PCT Pub. No.: WO95/21335

PCT Pub. Date: Aug. 10, 1995

(30) Foreign Application Priority Data

Feb. 1, 1994 (DE) .................................................. 44 02 982
Feb. 3, 1994 (DE) .................................................. 44 03 193

(51) Int. Cl.[7] ............................ F16B 39/00; F16B 35/04; F16B 21/18; F16B 13/06
(52) U.S. Cl. .............................. 411/353; 411/107; 411/999
(58) Field of Search ................................... 411/107, 109, 411/352, 353, 533, 970, 999

(56) References Cited

U.S. PATENT DOCUMENTS 1,572,770 * 2/1926 Colley .................................... 411/353

2,486,670 * 11/1949 Nigg et al. ............................. 411/970

(List continued on next page.)

FOREIGN PATENT DOCUMENTS

| G8714488.3 | 2/1988 | (DE) . | |
|---|---|---|---|
| 44 23 448 | 1/1996 | (DE) . | |
| 0272642 | 6/1988 | (EP) . | |
| 0618385 | 10/1994 | (EP) . | |
| 2 372 986 | 6/1978 | (FR) . | |
| 0125200 | * 4/1919 | (GB) | .................................... 411/107 |
| 2039660 | * 8/1980 | (GB) | .................................... 411/109 |

Primary Examiner—Lynne H. Browne
Assistant Examiner—Robert G. Santos
(74) Attorney, Agent, or Firm—Venable; Gabor J. Kelemen

(57) ABSTRACT

A mounting unit includes a mounting part having an activation side defining an opening leading to a throughbore. A fixing part is insertable into the throughbore is fastenable to the mounting part, the fixing part including: a head which allows a fastening of the fixing part to the mounting part; a shaft adjoining the head on a top end thereof and being insertable with its bottom portion and with radial play into the throughbore; fixing projections disposed at the bottom portion of the shaft and extending beyond a cross section of the shaft in a plane perpendicular to the shaft longitudinal axis, the fixing projections being effective over an entire circumference of the shaft for fastening the fixing part to the mounting part; and an undercutting space disposed between the head and the fixing projections. A holding sleeve is adapted to be fastened to the mounting part and to surround the shaft and the fixing projections with radial play after the fixing part is inserted into the mounting part. The sleeve includes a holding collar at a top end thereof having a plurality of holding projections distributed across its circumference which allow the fixing part to pass therethrough unhindered during its insertion into the mounting part. The holding projections are deformable such that they project into the undercutting space in a radially inward direction after an insertion of the fixing part into the mounting part thereby lockingly opposing a loosening of the fixing part with respect to the mounting part.

21 Claims, 12 Drawing Sheets

U.S. PATENT DOCUMENTS

| | | | |
|---|---|---|---|
| 3,156,281 | * | 11/1964 | Demi ........................... 411/107 |
| 3,286,579 | * | 11/1966 | Lovisek ........................ 411/999 |
| 3,389,736 | | 6/1968 | Gullstan . |
| 3,465,803 | | 9/1969 | Ernest et al. . |
| 3,505,921 | * | 4/1970 | Wigam ......................... 411/999 |
| 3,812,758 | * | 5/1974 | Bossler, Jr. .................. 411/14 |
| 3,886,840 | * | 6/1975 | Bossler ........................ 411/14 |
| 4,002,100 | * | 1/1977 | Bucheli ........................ 411/61 |
| 4,732,519 | * | 3/1988 | Wagner ........................ 411/107 |
| 4,828,444 | * | 5/1989 | Oshida ........................ 411/437 |
| 4,952,107 | * | 8/1990 | Dupree ........................ 411/107 X |
| 4,971,497 | * | 11/1990 | Stoffer et al. ................ 411/108 |
| 4,975,008 | * | 12/1990 | Wagner ........................ 411/533 X |
| 5,020,951 | * | 6/1991 | Smith .......................... 411/107 |
| 5,094,579 | * | 3/1992 | Johnson ........................ 411/107 |
| 5,244,325 | * | 9/1993 | Knohl .......................... 411/107 X |
| 5,462,395 | * | 10/1995 | Damm et al. ................. 411/353 X |
| 5,513,933 | * | 5/1996 | Rom ............................ 411/107 X |
| 5,662,444 | * | 9/1997 | Schmidt, Jr. ................. 411/353 X |
| 5,711,711 | * | 1/1998 | Schmidt, Jr. ................. 470/41 |
| 5,782,595 | * | 7/1998 | Schneider ..................... 411/107 X |
| 5,807,052 | * | 9/1998 | Van Boven et al. ........... 411/353 |
| 5,871,319 | * | 2/1999 | Schneider ..................... 411/107 |
| 6,044,536 | * | 4/2000 | Schneider ..................... 411/353 X |
| 6,059,503 | * | 5/2000 | Johnson ........................ 411/353 |
| 6,174,118 | * | 1/2001 | Rebers et al. ................. 411/352 |
| 6,176,665 | * | 1/2001 | Bondarowicz et al. ......... 411/999 X |
| 6,227,783 | * | 5/2001 | Salameh ....................... 411/353 |
| 6,227,784 | * | 5/2001 | Antoine et al. ................ 411/353 X |

* cited by examiner

MOUNTING UNIT AND METHOD OF MAKING SAME

FIELD OF THE INVENTION

The invention relates to a mounting unit having a mounting part, a fixing part, and a holding part that functions as an anti-loosening lock between the mounting part and the fixing part.

BACKGROUND OF THE INVENTION

Mounting units are known, for example, from EP 0 272 642 B1. In that reference, a sleeve-shaped holding part not only serves as an anti-loosening lock, but also as a carrier for an intermediate part made of a rubbery material inserted between the mounting unit and the holding part. The intermediate part is further designed to insulate against noise emanating from the structure. The rubbery consistency of the intermediate part and the thin-wall design of the holding part permit their radial, elastic expansion, thus making it simple to produce an anti-loosening lock. For the above purpose, the sleeve has at the upper end of its throughbore a collar that slightly necks to form an axial interlock or function as part of the anti-loosening lock. During the axial insertion of the fixing part into the sleeve, the collar is expanded elastically in a radial direction by two radial projections on the fixing part which extend past the transverse cross-section of a shaft of the fixing part. Once the radial projections have passed, the collar bounces back radially toward the inside of the sleeve into the undercutting area or space of the shaft. The above completes the fixation safety device. However, the aforementioned premises for a radial expandability through the elasticity of the sleeve collar limit the possible uses for the above arrangement.

The trend in assembly technology is toward working with the highest possible degree of prefabrication. Whereas in the past, for example, screws were not screwed in until the final assembly of a mounting part—e.g. a casing lid—it is now expected that this mounting part is delivered with the necessary mounting screws already in place as one mounting unit, ready for final assembly. The final assembly can then be produced in a comparably much shorter amount of time, and, if necessary, even automatically with a robot. In doing so, it must be ensured that the screws are connected to the mounting unit such that they cannot become loose. At the same time, the selection of the material for the mounting part in most cases cannot be a function of whether it is suitable for the pre-fixation of the fastening screws to the mounting part to form an anti-loosening lock.

Furthermore, it must be guaranteed that the fixing ends, meaning the threads for the screws, remain undamaged between preliminary assembly and final assembly. In particular, this concerns the transport and storage of mounting parts equipped with fixing parts. An additional problem is that the mounting part has several screws around the circumference, as is the case, for example, with casing lids. In that case, precautions must be taken during the assembly that the mounting part is not skewed when the screw threads do not simultaneously engage in their counter-threads. This would impede further assembly or make it impossible. This applies in particular when, due to production tolerances on the base component, for example, an engine block, the counter-threads which cooperate with the thread of the fixing part are not positioned precisely, that is, if their axes are offset with respect to the axes of the threads of the fixing part.

Such a mounting unit is known from U.S. Pat. No. 3,465,803 A. In this reference, the axially effective captively securing arrangement between fixing part and holding part is accomplished through plastic deformation of the holding projection which is oriented radially inward on the holding part in the manner of a circumferential collar. For this purpose, an annular flange is provided between head and shaft of the fixing part, with the annular flange projecting radially beyond the shaft; at the end of the joining process, the annular flange acts in the manner of a collar radially inwardly oriented holding projection of the holding part with its shoulder which is adjoining the shaft and plastically deforms the holding projection such that its effective inside diameter is made smaller and it is therewith moved into a position in which it extends behind the fixing projection of the fixing part configured there as a screw thread. But during this process the annular flange creates a connection, seen radially, between fixing part and holding part in the final joining position, which connection only allows a slight radial play between these parts.

In addition, the plastic deformation of the holding projection for the creation of the captively securing arrangement requires a considerable joining pressure. To transmit this joining pressure, the annular flange below the head of the fixing part is configured to be relatively massive. The holding part must have a great wall thickness so as to prevent the holding part from being deformed under the necessary high joining pressure. During assembly, the lacking radial play makes it impossible to compensate for hole inaccuracies.

Furthermore, such mounting units, for example, are known from EP 0 272 642 B1. There, the sleeve-shaped holding part not only serves as anti-loosening lock, but also as carrier for an intermediate part made of a rubbery material that is inserted between mounting unit and holding part and is designed to insulate against structure-born noise. The rubbery consistency of this intermediate part and the thin-wall design of the holding part permit their radial expandability, thus making it simple to produce an anti-loosening lock. For this, the sleeve has at the upper end of its throughbore a collar that slightly necks in the clear opening to form an axial interlock or function as part of the anti-loosening lock. During the axial insertion of the fixing part, this collar is expanded elastically in radial direction by two radial projections on the fixing part, which extend past the shaft cross-section. Once the radial projections have passed, the collar bounces back radially toward the inside, into the undercutting area of the shaft for the fixing part. This completes the anti-loosening lock. However, the aforementioned premises for a radial expandability through elasticity of the sleeve collar limit the possible uses for this solution.

SUMMARY OF THE INVENTION

It is the object of the invention to design mounting units such as the ones described above in such a way that they may be assembled without the disadvantages set forth previously. In particular, the invention is aimed at providing the mounting unit in a simple way with reliable anti-loosening locks for the fixing parts, and to design them in such a way that prior to the final assembly, the fixing ends are securely and permanently protected against damage, while still in a position ready for screwing in.

The above object and many others to become apparent as the description progresses is achieved by the instant invention, which provides mounting unit including a mounting part having an activation side defining an opening leading to a throughbore. A fixing part is insertable into the throughbore, is fastenable to the mounting part, and includes: a head which allows a fastening of the fixing part to the mounting part; a shaft adjoining the head on a top end thereof and being insertable with its bottom portion and with radial play into the throughbore; fixing projections disposed at the bottom portion of the shaft and extending beyond a cross section of the shaft in a plane perpendicular to the shaft longitudinal axis, the fixing projections being effective over an entire circumference of the shaft for fastening the fixing part to the mounting part; and an undercutting space disposed between the head and the fixing projections. A holding sleeve is adapted to be fastened to the mounting part and to surround the shaft and the fixing projections with radial play after the fixing part is inserted into the mounting part. The sleeve includes a holding collar at a top end thereof having a plurality of holding projections distributed across its circumference which allow the fixing part to pass therethrough unhindered during its insertion into the mounting part. The holding projections are deformable such that they project into the undercutting space in a radially inward direction after an insertion of the fixing part into the mounting part thereby lockingly opposing a loosening of the fixing part with respect to the mounting part.

The design of the holding part according to the invention as a holding sleeve together with the special positioning of the holding projections makes it particularly easy to produce the anti-loosening lock with only slight changes to the mounting part. Because of the separate, sleeve-shaped holding part, or holding sleeve, the designer is not forced to predetermine a working material for the mounting part, making it easier to adjust the sleeve material to the necessities of an effective anti-loosening lock. The same is true correspondingly for the measures to effectively protect the fixing part in the area of its fixing projection or fixing means prior to the final assembly. If this fixing projection, e.g. a screw thread, extends over a larger axial area on the shaft end and if the mounting part that is penetrated by the fixing part has only a limited wall thickness, then the sleeve as an additionally existing holding part outside of the mounting part can create an effective sleeve area in the axial direction for a secure installation of the fixing part that is in danger of being damaged. The deformation in the axial direction of the holding projections during the joining operation means that the wall thickness of the sleeve here does not influence the deformability of the holding projection. In addition, the solution according to the invention provides sufficient play between fixing part and mounting part, as is necessary for controlling the assembly tolerances. Finally, the sleeve length can simply be restricted to the dimensions necessary for a secure housing of the fixing part.

The object of the invention can be realized in several different ways. For example, the collar of the holding part may be preformed and may essentially be deformed elastically during the axial insertion of the fixing part. The above solution is ensured for the most part simply by virtue of an elastic deformation of the elements necessary for the anti-loosening lock, that is the mounting part, the holding part and the fixing part. Allowances can be made for a partial, additional plastic deformation or shearing off of the collar and/or the fixing means, which favors greater processing tolerances. Alternatively, the collar of the mounting part may be formed only through plastic deformation during the axial insertion of the fixing part.

According to one aspect of the invention, the fixing means comprise a ring flange and a fixing member both rolled into the shaft. The above structure has the advantage that the rolled-in necking of the circumference to produce the ring flange in the shape of a ring groove functions as a screw thread run-out and makes it possible for the nut thread to be screwed on top. This places the radial projection favorably close to the screw thread, meaning to the fixing art that must be protected during the storage and pre-assembly position. The effective sleeve length of the holding part, needed to implement the above, can be minimized correspondingly.

According to another aspect of the invention, the fixing member comprises a screw thread and the shaft further defines a non-threaded ring groove disposed adjacent the fixing member and rolled into the shaft such that material displaced by the ring groove forms the ring flange, the ring flange flanking the ring groove.

According to an alternative aspect of the invention, the fixing member comprises a screw thread and the fixing means further comprise a knurl rolled into the shaft and comprising knurl projections evenly distributed over the circumference of the shaft.

According to yet another aspect of the invention, the fixing means are tapered in the insertion direction, thus favoring the insertion of the fixing part into the holding part.

According to a further aspect of the invention, the holding sleeve projects in an axial direction over the activation side of the mounting part. The above measure is applied if the effective axial length of the fixing end of the fixing part is longer than the wall thickness of the mounting part penetrated by the fixing part. It is advisable here to have an increased wall thickness of the sleeve area, especially for the segment outside of the mounting part, so as to permit a better transmission of the fixing pressure exerted by the head of the fixing part on the mounting part during the final assembly.

According to one aspect of the invention, the holding sleeve is adapted to be fastened at one end thereof into the throughbore of the mounting part.

A configuration of the holding sleeve to include a ring flange thereon adapted to rest on the activation side of the mounting part when the holding sleeve is fastened to the mounting part presupposes that the anti-loosening lock is created mostly through plastic deformation of the holding parts during the axial insertion of the fixing part. The forces necessary for plastic deformation can be kept comparatively low by selecting suitable materials for the sleeve. However, the above can be realized by a suitable shaping of the holding projections. Thus, the holding projections may be deformable by the head of the fixing part in the insertion direction for lockingly opposing a loosening of the fixing part with respect to the mounting part. Alternatively, each of the holding projections may define a projection surface thereon inclined with respect to the insertion direction such that, prior to a deformation of said each of the holding projections, the projection surface being configured such that it rests approximately on a mantle of a virtual straight cone coaxial with the holding sleeve and having a vertex disposed away from the mounting part when the holding sleeve is fastened to the mounting part. The holding projections may further be bent slightly radially inward prior to the insertion of the fixing part into the mounting part. The holding projections may also include bending notches therein on a radially inward base area thereof.

In addition to the bending notches, each of the holding projections may include rounded-off outside edges. The above measure ensures that the punching ridges or the outside edges of the holding projections after they are bent in toward the holding position as anti-loosening lock, do not stick out in the direction of the fixing part head and impede its tightening. The alternative concerning rounded off outside edges of the holding projections can be determined simply through the punching direction during the punching operation.

A normal orientation of the sleeve in relation to the mounting part can be realized even better through a configuration of the holding sleeve to include a ring flange thereon adapted to rest on the activation side of the mounting part when the holding sleeve is fastened to the mounting part. This is of particular advantage if the throughbore itself, for example, is lined with a noise-dampening cuff of a soft material.

Mounting parts having relatively large wall thicknesses are sufficient to completely accommodate between their outside walls the fixing projection that operates jointly with the fixing part of the sleeve or the thread of the sleeve holding part. In that case, the sleeve does not have to extend past the limiting walls of the mounting part. Thus, a sleeve housed completely inside the throughbore is sufficient to ready the holding projections. Thus, a configuration of the holding sleeve as a sheet metal cutting adapted to line circumferential walls of the throughbore of the mounting part, is particularly cost-effective. To stabilize the final sleeve shape, the sheet metal cutting may have side edges and may be adapted to line the circumferential walls of the throughbore of the mounting part over an angle of 360° about a longitudinal axis of the throughbore such that its side edges abut one another. The side edges may be configured to enmesh one another.

According to one aspect of the invention, the holding projections may comprise nubs adapted to be axially impressed by the head of the fixing part thereby being plastically deformed after an insertion of the fixing part into the mounting part. Thus, a particularly simple method is provided for producing holding projections that function like a collar for sleeves made from a sheet metal blank with ring flange and a plastic joining process.

According to yet another aspect of the invention, the holding sleeve may have bead-like interlocking projections on a circumferential jacket thereof. The above configuration is advantageous, particularly if the mounting part is a molded plastic part. In that case, the wart-like interlocking projections ensure a secure clamping together of sleeve and mounting part.

According to one aspect of the invention, the head of the fixing part defines a concave notch on a supporting side thereof in a circumferential area of the shaft. The above ensures a tight fit between the bearing surface of the fixing part head and the mounting part surface, even if, following a plastic deformation of the holding projections to change these to the inward-pointing anti-loosening lock position, the holding projections should still project axially over the surface of the mounting part.

A process for producing the anti-loosening locks according to the invention comprises the steps of inserting the fixing part with a fixing end thereof into the holding sleeve from the top end of the holding sleeve; and applying pressure to the holding projections in the insertion direction for deforming the holding projections such that they project into the undercutting space in a radially inward direction after the insertion of the fixing part into the mounting part thereby lockingly opposing a loosening of the fixing part with respect to the mounting part.

BRIEF DESCRIPTION OF THE DRAWINGS

The foregoing objects of the invention, together with other objects and advantages which may be attained by its use, will become more apparent upon reading the following detailed description of the invention taken in conjunction with the drawings. In the drawings, where like reference numerals identify corresponding components:

FIG. 9 is a cross-section through a borehole in the mounting part configured to receive holding parts therein according to FIGS. 8 and 8a.

FIG. 10 is a fixing part or screw according to FIGS. 1 and 6 as a screw in a position ready for being joined to the oppositely disposed mounting part according to FIG. 9 and holding part according to FIG. 8a.

DETAILED DESCRIPTION OF THE INVENTION

Figure 4:
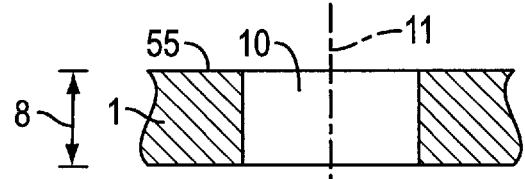
FIG. 4 is a cross-sectional view of a mounting part in the fixing range of the accompanying holding part.
Figure 5:
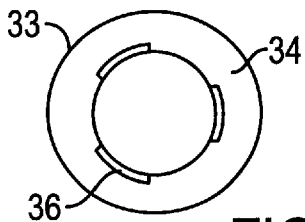
FIG. 5 is a top view of the holding part in FIG. 3 in the direction of arrow VIII.

The mounting unit essentially comprises three parts, the casing lid 1 (FIG. 4), generally referred to as the mounting part, screw 2, generally referred to as the fixing part, and the sleeve 3, generally referred to as the sleeve-shaped holding part.

Figure 1A:
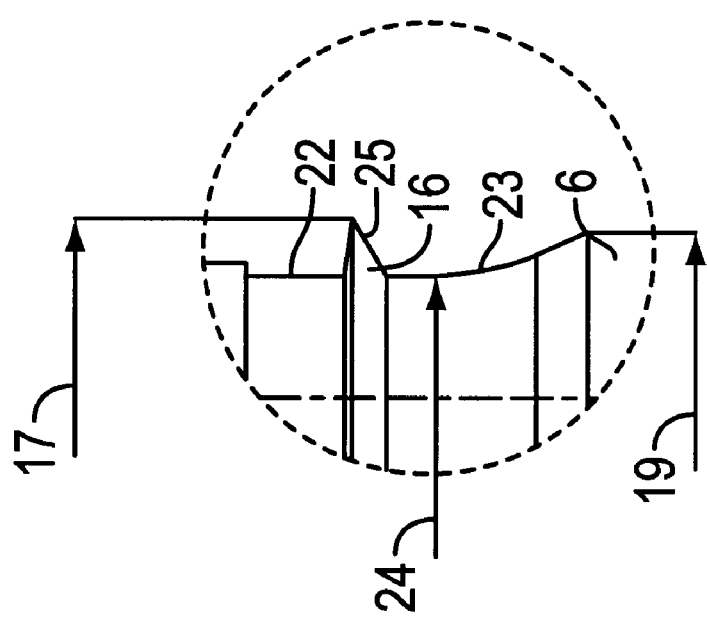
FIG. 1a is an enlarged view of portion Ia in FIG. 1.
Figure 1:
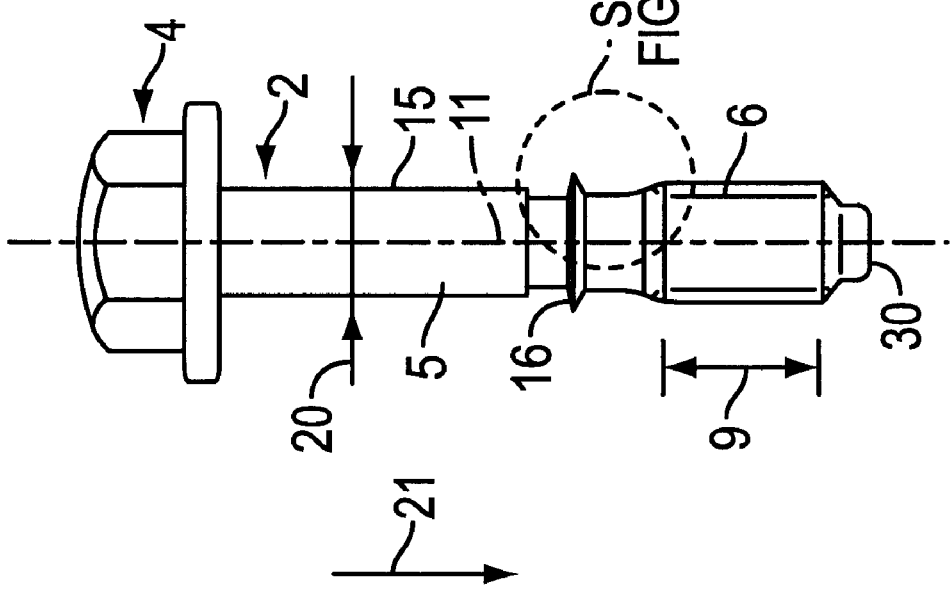
FIG. 1 is a side view of a screw which forms the fixing part of the mounting unit.

As seen in FIG. 1 screw 2 has a head 4, used to fix the screw to the mounting part. Head 4 is joined by screw shaft 5 with screw thread 6 at its lower end. The screw is generally referred to as a fixing member or fixing part.

Screw 2 serves to lock in place a mounting part, that is the lid 1, on a machine part, e.g. a machine casing. Lid 1 frequently is comparably thin-walled, its wall thickness 8 being frequently clearly less than the thread length 9, so that if screw 2 were held in an anti-loosening position directly at lid 1, the screw thread 6 would be unprotected outside of the embracing wall thickness 8 of lid 1.

In order to avoid such an unprotected position, the effective length of the throughbore 10, which is measured in the direction of screw axis 11, is extended by holding part or sleeve 33. The sleeve 3 is connected tightly with lid 1, that is on the side facing screw head 4 in the mounting position. The sleeve has a throughbore 12 having a width 13. The width or inside diameter 13 is dimensioned such that sleeve 33 surrounds screw shaft 5 of screw 2 with radial play.

The outside diameter 19 (FIG. 1a) of screw thread 6 is smaller than the outside diameter 17 of the ring flange 16, but is larger than the shaft diameter 20 (FIG. 1) of screw 2.

Ring flange 16 of the fixing part is formed by rolling in—in the exemplary embodiment two—ring grooves 22, 23 into screw shaft 5. These ring grooves 22, 23 are neckings of shaft 5, which flank the ring flange 16. Their diameter 24 is smaller than the shaft diameter 20. By rolling in the two ring grooves 22, 23, the displaced shaft material is shaped out toward ring flange 16 with a comparably large outside diameter 17, which effectively serves as an axial interlock. Ring groove 23, which faces the screw thread 6, also serves as a thread runout and permits the nut thread to be screwed on.

In place of the ring flange 16, it is also conceivable—though not with all the described advantages—to have a knurl with knurl projections that are evenly distributed over the shaft circumference.

Figure 6:
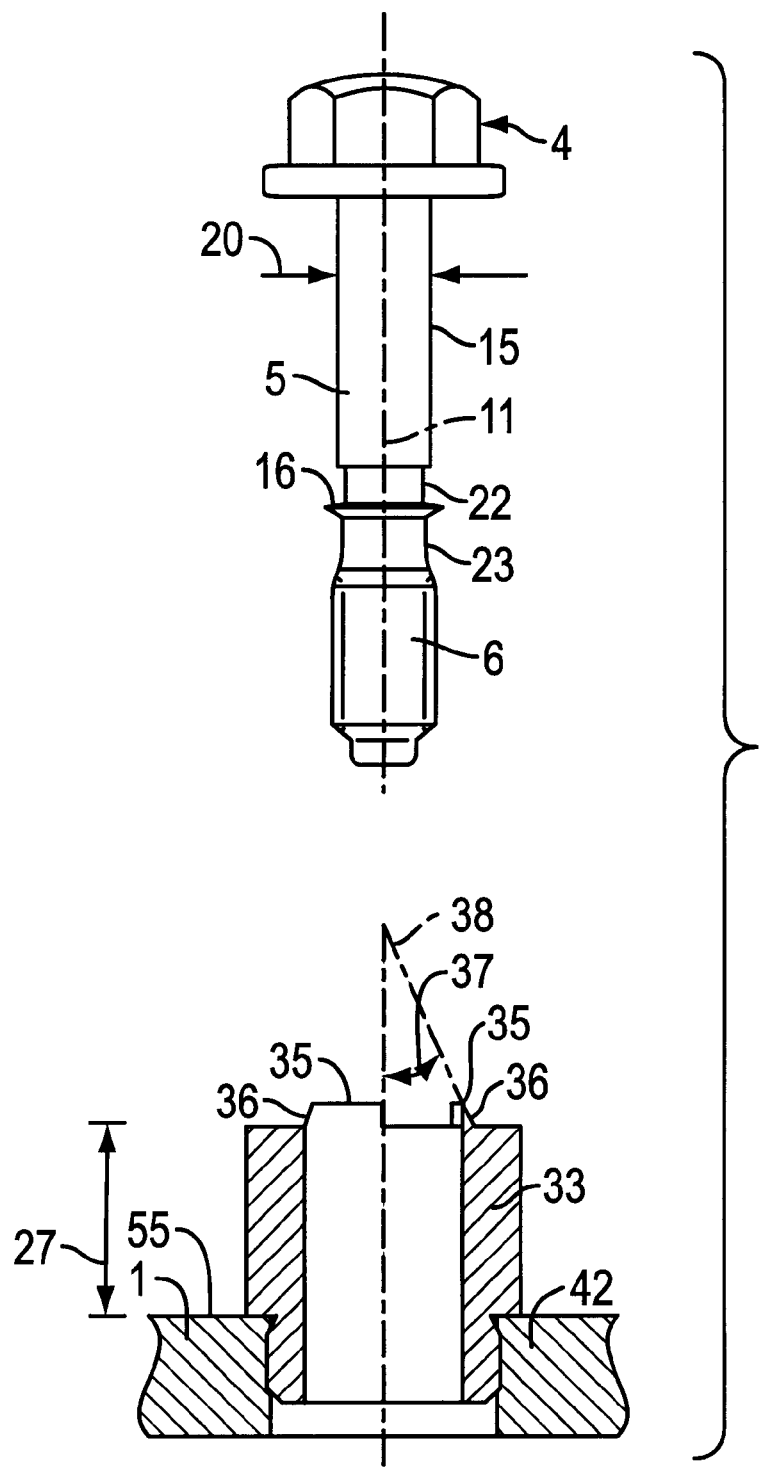
FIG. 6 shows the fixing part in the embodiment according to FIG. 1, in the initial position for joining and disposed above a sectional view of the holding part of FIG. 3 connected to the mounting part of FIG. 4.
Figure 7:
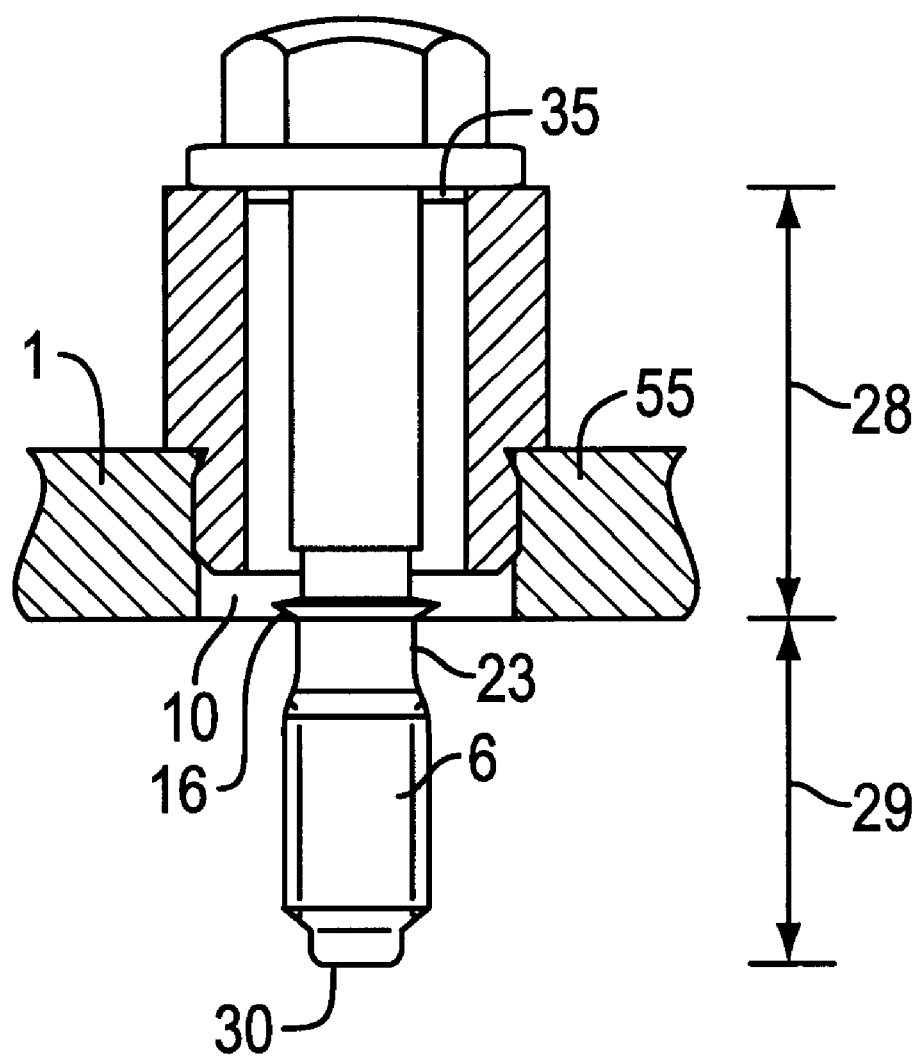
FIG. 7 shows the fixing part, the holding part and the mounting part according to FIG. 6, in the joined, anti-loosening lock position.
Figure 8:
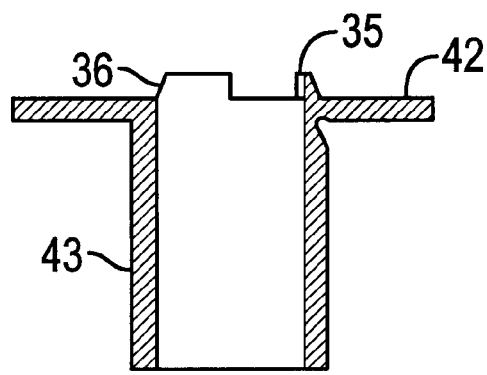
FIGS. 8 and 8a show the sectional views of sleeve-shaped holding parts adapted to be completed embedded into a mounting part.
Figure 8A:
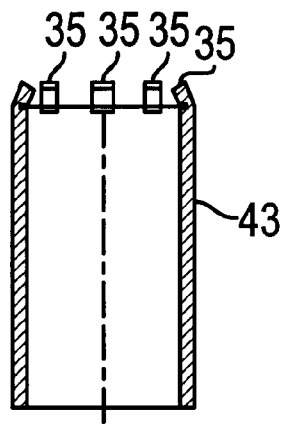
Figure 9:
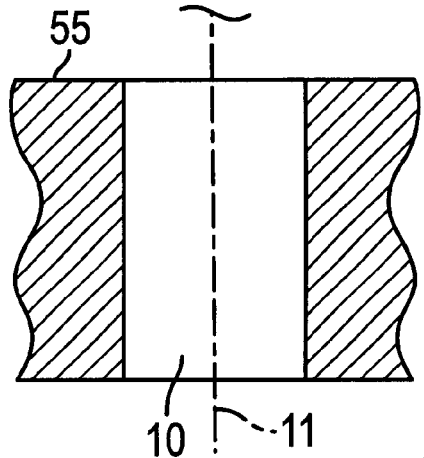
Figure 10:
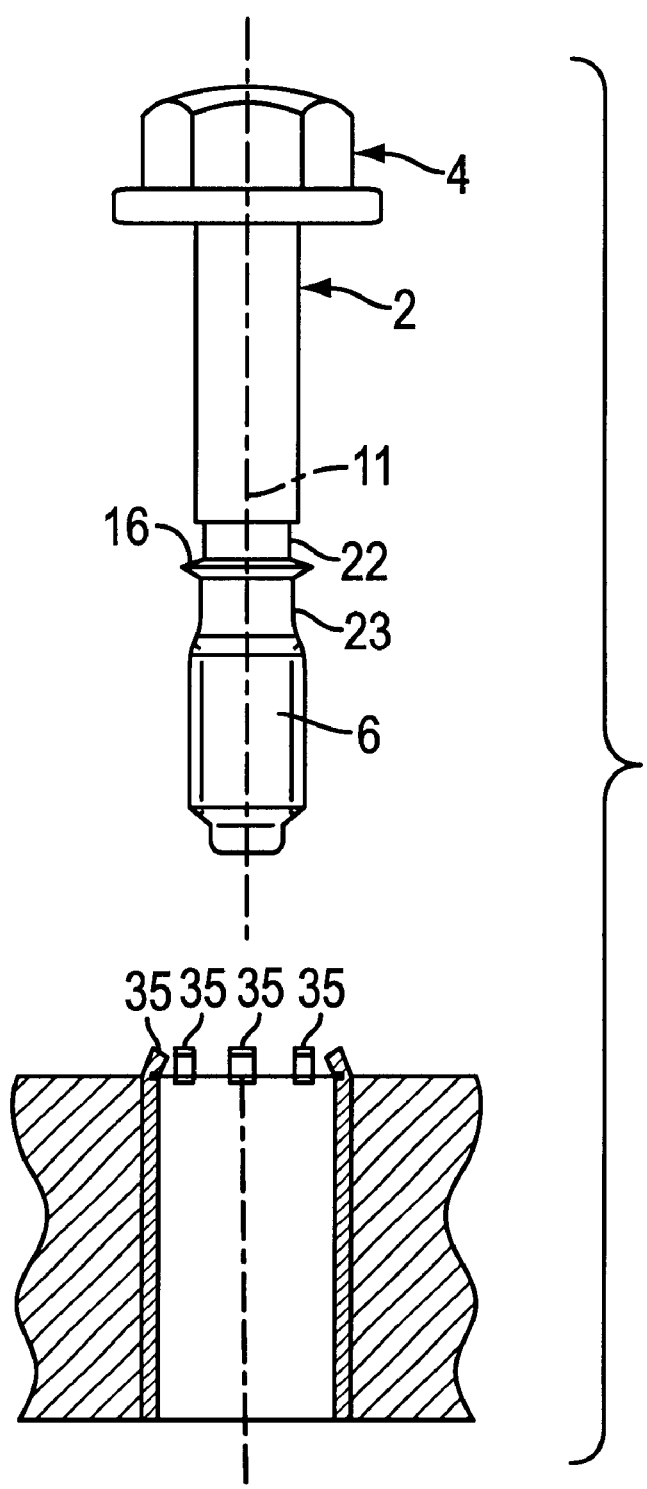
Figure 11:
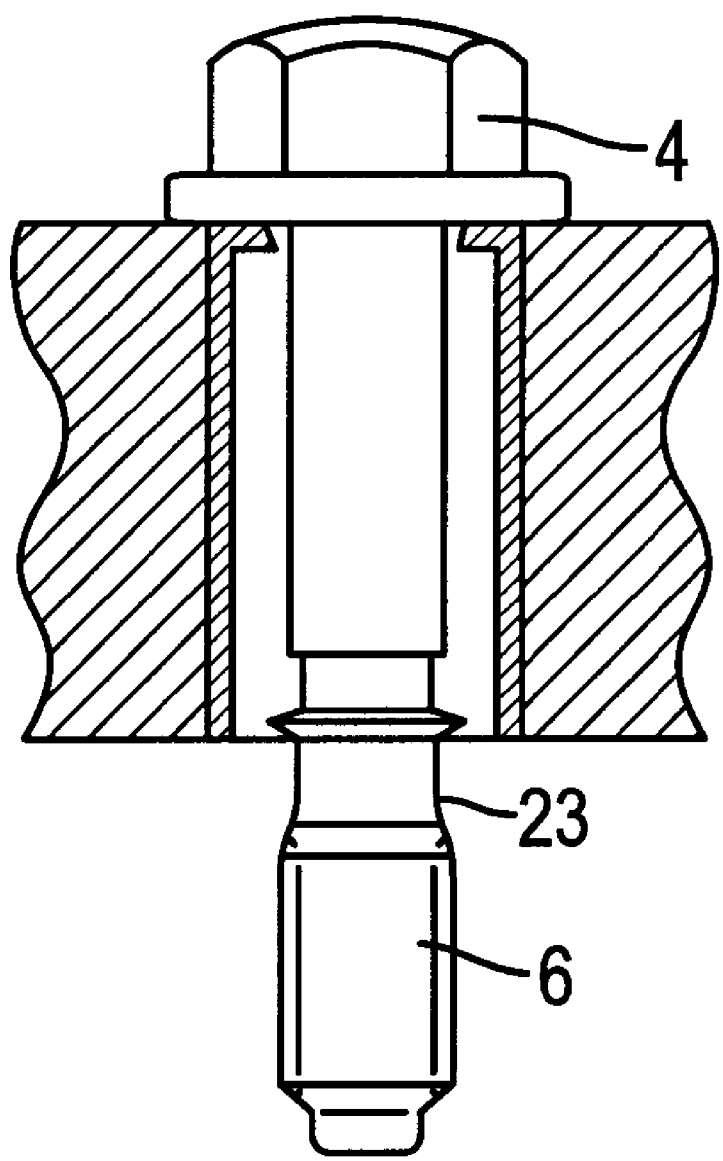
FIG. 11 shows the fixing part, the holding part and the mounting part according to FIG. 10 in the joined, anti-loosening lock position.

FIG. 6 shows that the holding part, namely sleeve 33, extends as fitted-on sleeve with part 27 of its axial extension over actuation side 55 of lid 1. Furthermore, the following dimensional relationships can be seen in FIG. 7: the maximum distance 28 between the two axial interlock parts 35, 16 of the mounting unit is advisably larger than the axial distance 29 between ring flange 16 and shaft end 30, so that, in the storage position, the sensitive screw thread 6 is submerged completely in an enveloped position on the mounting part, meaning in sleeve 33. The possible screw-in depth of screw 2 is also increased through ring groove 23.

The sleeve 33 is fixed to lid 1 by pressing the sleeve end 31 into the throughbore 10 of lid 1. However, a soldered or welded connection is conceivable as well.

Figure 2:
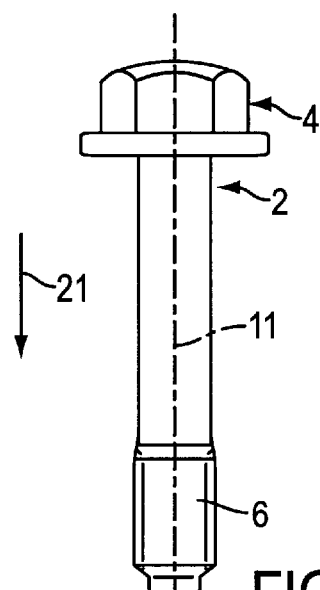
FIG. 2 is a view similar to FIG. 1 showing an alternative embodiment of a screw according to the invention.
Figure 3:
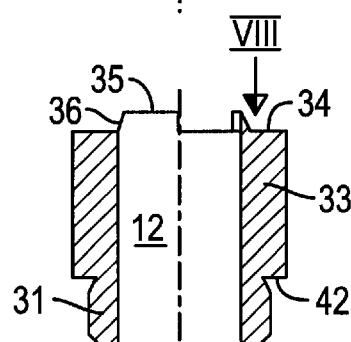
FIG. 3 is a vertical cross-sectional view of a sleeve-shaped holding part.

The axial interlock of the holding part 33 is formed through plastic deformation only during the axial insertion of screw 2 therein, which has an essentially unchanged shape. Moreover, a screw design without the ring flange 16, as shown in FIG. 2, is also conceivable. In that case, the screw thread 6 assumes the function of a fixing projection that produces the anti-loosening lock, even though the operational security is not ensured quite as well in that case.

As shown in FIGS. 3, 6, 12, 14, 16 and 23, the front end 34 of sleeve 33, which is facing the screw head 4, has several holding projections 35 that are distributed over the circumference thereof. The holding projections 35 are edge projections that are bent inward for the anti-loosening lock, such that they project into the undercutting area 15 of screw 2 when the screw is inserted into sleeve 33, but are pointing in a radial direction while in the initial position as shown in FIG. 6. With the axial insertion of screw 2, which forms the anti-loosening lock in press-in direction 21, the holding projections 35 are deformed by the screw head 4 in the direction of screw axis 11 or into the undercutting area 15. Flanges 36 of edge projections 35, which are located at a radial clearance to the outside of the edge projections, are tapered in the initial position, that is prior to the deformation of the edge projections. Together with the sleeve axis or screw axis 11, the tapered edges form a sharp angle 37 that closes in the direction away from sleeve 33. As a result, the slanted surfaces rest approximately on the jacket of a virtual, straight-line pyramid that is coaxial with sleeve 33 or a corresponding cone. The point of this cone or the angular vertex 38 faces the screw head 4 just prior to the insertion of screw 2 into sleeve 33.

Holding projections 35 can also be bent inward slightly at a radial clearance to form tapered edges 36. In any case, the tapered edges 36 of the outside flanges for holding projections 35 ensure that during the pressing in of head 4 of screw 2, projections 35 are bent inward, at a radial clearance, into the undercutting area 15 of screw 2.

To facilitate these inward bending operations, the axial holding projections 35 can have cross-sectional weak points that are effective as desired bending notches 39 (FIG. 16) at their base area, which is positioned at a radial clearance inward.

Figure 17:
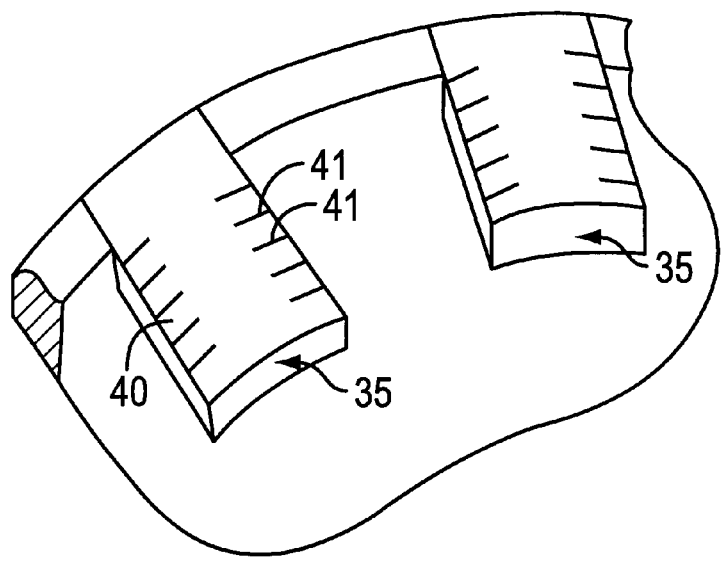
FIG. 17 is an enlarged sectional view of the sleeve region in FIG. 16, with holding projections which are bent inward for allowing interlocking of the fixing part with the sleeve.

As seen in FIG. 17, it is advisable if the outside edges 40, 41 of holding projections 35 are rounded. These rounded edges can be formed simply by stamping them from the sleeve material, wherein the stamping direction is selected such that the rounding of the edges occurs automatically. When screw 2 is being inserted into the sleeve, the friction resistance is reduced as a result of these rounded edges.

The ring flange 42 of holding part 33 rests on the actuation side of the mounting part or lid 1.

Figure 13:
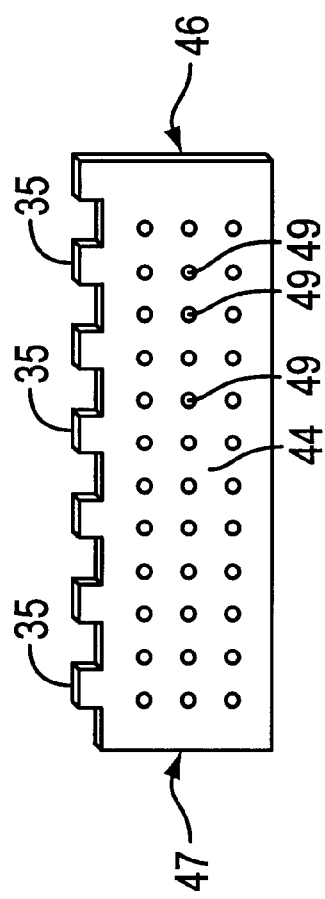
FIG. 13 is a perspective view of an unrolled sheet-metal blank for forming the sleeve according to FIG. 12.
Figure 12:
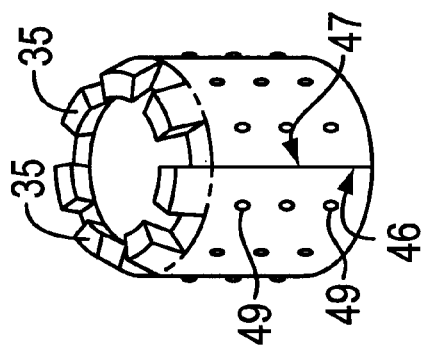
FIG. 12 is a perspective view of a sleeve-shaped holding part.
Figure 15:
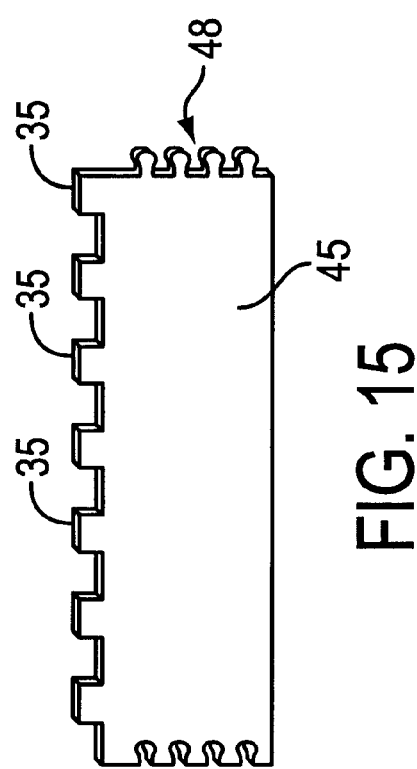
FIGS. 14 and 15 are representations similar to FIGS. 12 and 13 corresponding to an alternative embodiment of the holding part.
Figure 14:
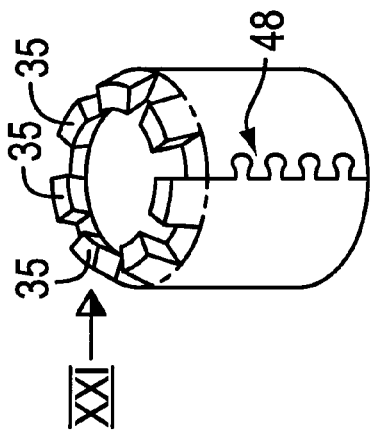
Figure 16:
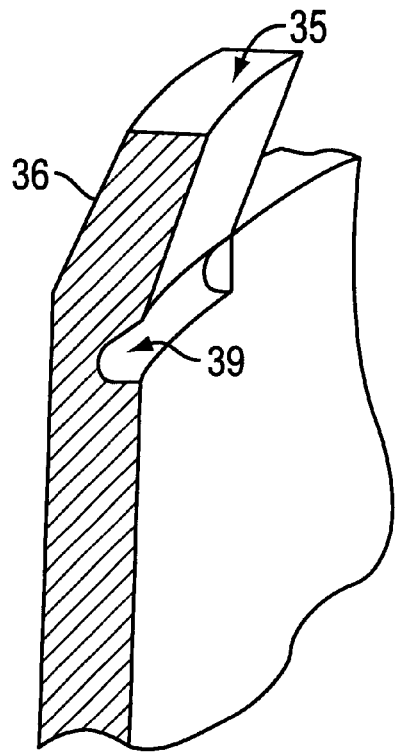
FIG. 16 is an enlarged sectional view of the region indicated by arrow XXI in FIG. 14.
Figure 19:
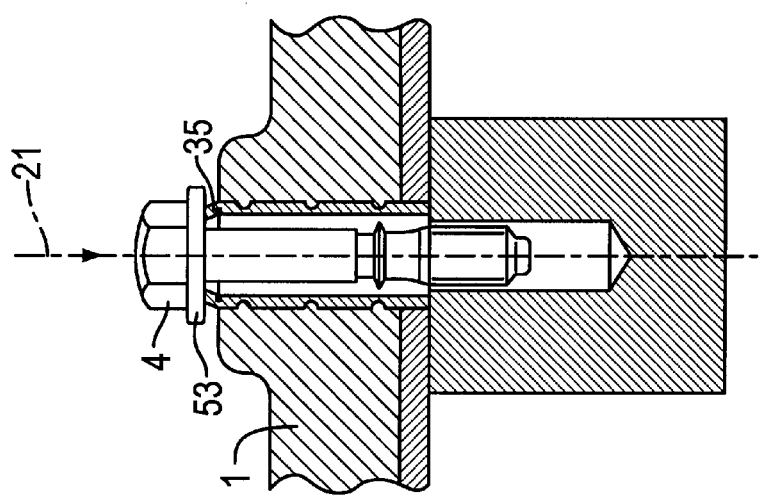
FIG. 19 is a cross-sectional view of the initial position for joining a mounting unit including the fixing part according to FIGS. 1, 6 and 10 as well as a mounting part with a holding part according to FIG. 18.
Figure 18:
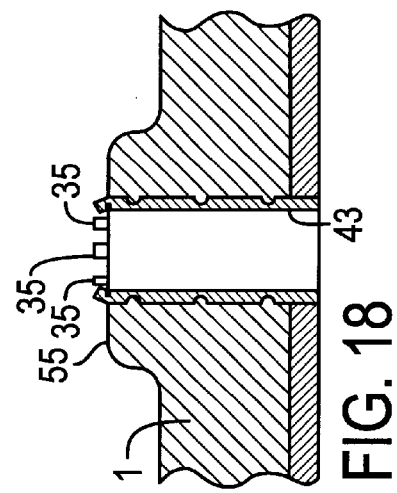
FIG. 18 is a cross section through a plastic mounting part into which a holding part is embedded.
Figure 20:
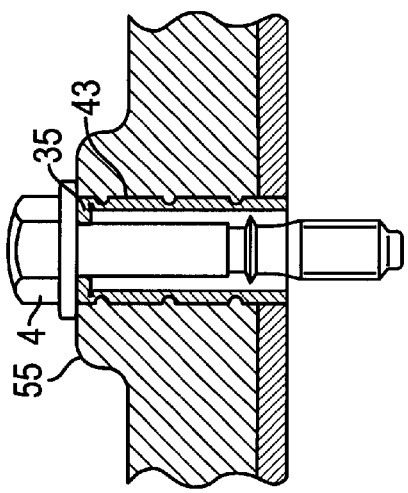
FIG. 20 is a cross-sectional view of the assembly in accordance with FIG. 19, after the joining operation.

According to one embodiment of the invention, with a corresponding wall thickness of the lid or mounting part 1, the holding part or sleeve 43 may be enclosed on its side walls by the lid 1 or the lid material (FIGS. 18–20). In that case, the holding projections 35 are bent inward for the anti-loosening lock position (FIG. 20), approximately in the plane of the actuation-side entrance to the throughbore 10 of the mounting part or lid 1. In such a case, it is advisable if insert sleeve 43 is formed by a sheet metal cutting 44 (FIG. 13) or 45 (FIG. 15), which lines the hole circumference. When assembled, as shown in FIGS. 12 and 14, the sheet metal cutting is placed 360° around the hole axis 11, causing its edges 46, 47, which run in the direction of the hole axis, to meet. The meeting edges can be indented, as can be seen from indentations 48 of the sheet metal cutting 45 (FIG. 15).

If sleeve 43 is intended for embedding into an injection-molded plastic lid 1, then it is advisable to have bead-like interlocking projections 49 around its circumferential jacket or side walls.

Figure 21:
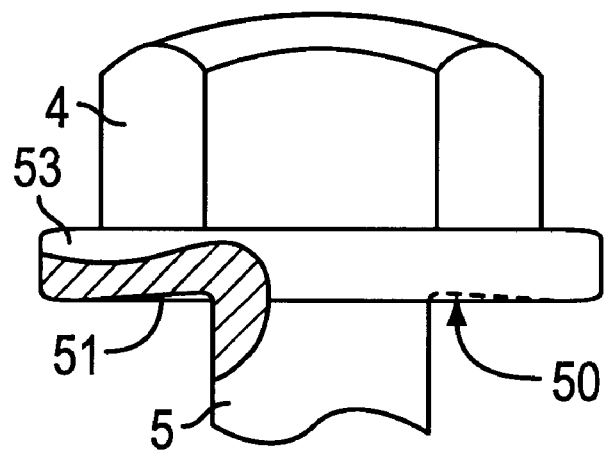
FIG. 21 shows an enlarged, partial section of the head of a fixing part.
Figure 22:
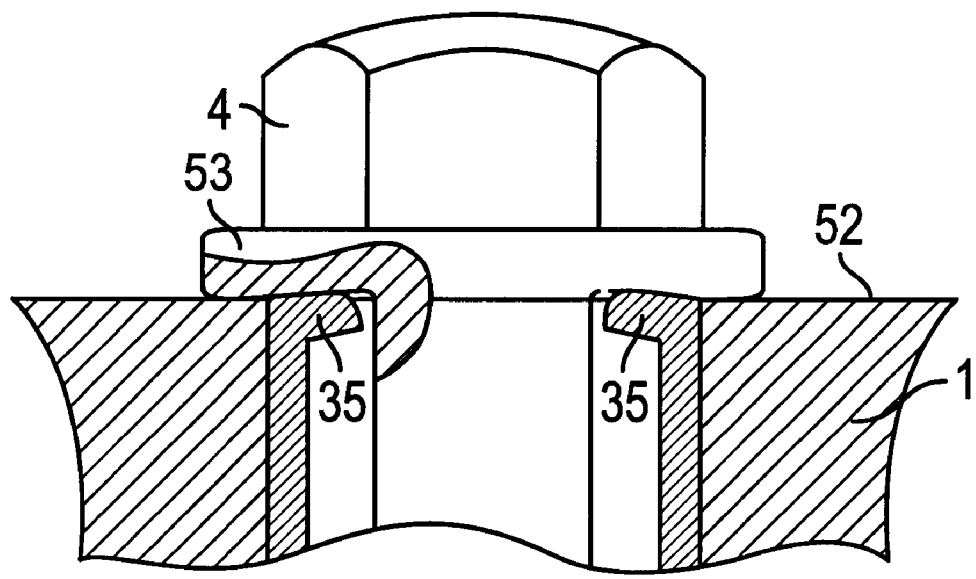
FIG. 22 is a cross-sectional view showing a head shaped according to FIG. 21 in a final joined position.

As seen in FIGS. 21 and 22, it is advisable that screw head 4 be notched out on its resting surface 50, on the circumferential area of shaft 5 (notch 51). The above feature ensures that a tightening of the screw is not obstructed by remnants of holding projections 35, which could possibly project from the surface 52, or by deformation ridges or similar items. With the outside circumference of its supporting flange 53, screw head 4 still fits flush against the surface 52 of lid 1.

The process for producing an anti-loosening lock unit which includes a mounting part 1, a fixing part 2 and a holding part 3 is accomplished by simply pressing screw 2 in press-in direction 21 into sleeve 3, which is connected tightly to lid 1 during which there is a plastic deformation of the holding projections 35.

Figure 23:
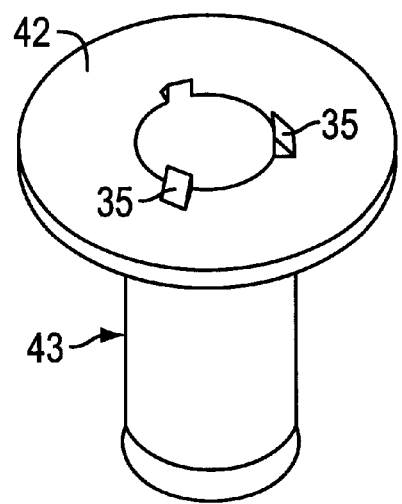
FIG. 23 is a top perspective view of a sleeve-shaped holding part having a flange ring.
Figure 24:
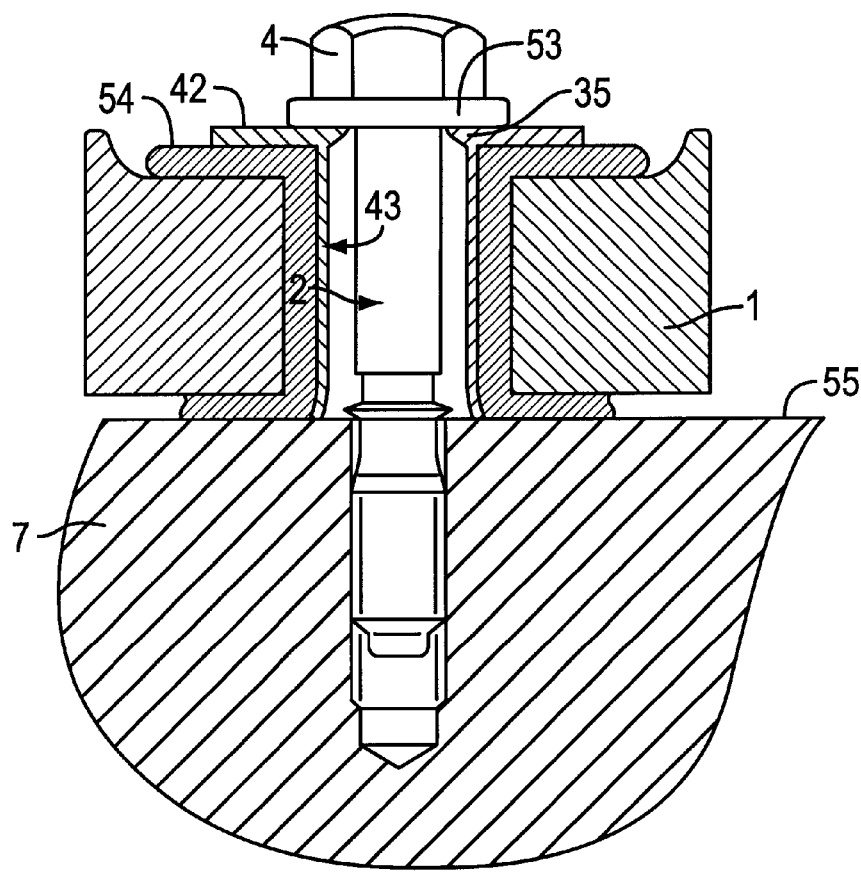
FIG. 24 is a sectional view of a fully assembled mounting unit having a plastic sleeve produced by using a mounting part according to FIG. 23.

With the embodiment according to FIG. 24, a plastic sleeve 54 of elastic rubber material, e.g. known for the purposes of sound absorption, is inserted between sleeve 43 of FIG. 23 and the hole wall in lid 1.

What is claimed is:

1. A mounting unit comprising:
   a mounting part having an activation side and a throughbore including an opening disposed at the activation side;
   a fixing part adapted to be inserted into the throughbore of the mounting part in an insertion direction and to be fastened to the mounting part, the fixing part including:
   a head adapted to allow a fastening of the fixing part to the mounting part;
   a shaft adjoining the head on a top end thereof and having a bottom portion and a shaft longitudinal axis, the shaft further being adapted to be inserted with its bottom portion and with radial play into the throughbore of the mounting part; and
   projecting fixing means disposed at the bottom portion of the shaft and extending beyond a cross section of the shaft in a plane perpendicular to the shaft longitudinal axis, the fixing means being effective over an entire circumference of the shaft for fastening the fixing part to the mounting part, the fixing means and the head defining an undercutting space therebetween; and
   a holding sleeve configured to be fixed in the throughbore by a fixing connection between the sleeve and the throughbore and including a holding collar at a top end thereof, the holding collar comprising a plurality of holding projections distributed across a circumference thereof, the holding projections further being adapted to extend in a radially inward direction such that there is radial and axial play with respect to the circumference of the shaft at a region of the undercutting space.

2. The mounting unit according to claim 1, wherein the fixing means comprise a ring flange and a fixing member both rolled into the shaft.

3. The mounting unit according to claim 2, wherein:
   the fixing member comprises a screw thread; and
   the shaft further defines a non-threaded ring groove disposed adjacent the fixing member and rolled into the shaft such that material displaced by the ring groove forms the ring flange, the ring flange flanking the ring groove.

4. The mounting unit according to claim 1, wherein the fixing means are tapered in the insertion direction.

5. The mounting unit according to claim 1, wherein the holding sleeve projects in an axial direction over the activation side of the mounting part.

6. The mounting unit according to claim 1, wherein the holding sleeve is adapted to be fastened at one end thereof into the throughbore of the mounting part.

7. The mounting unit according to claim 1, wherein the holding projections are adapted to be deformed by the head of the fixing part in the insertion direction for lockingly opposing a loosening of the fixing part with respect to the mounting part.

8. The mounting unit according to claim 1, wherein each of the holding projections defines a projection surface thereon inclined with respect to the insertion direction such that, prior to a deformation of said each of the holding projections, the projection surface is configured such that it rests approximately on a mantle of a virtual straight cone coaxial with the holding sleeve and having a vertex disposed away from the mounting part when the holding sleeve is fastened to the mounting part.

9. The mounting unit according to claim 1, wherein the holding projections are bent slightly radially inward prior to the insertion of the fixing part into the mounting part.

10. The mounting unit according to claim 1, wherein the holding projections include bending notches therein on a radially inward base area thereof.

11. The mounting unit according to claim 1, wherein each of the holding projections includes rounded-off outside edges.

12. The mounting unit according to claim 1, wherein the holding sleeve includes a ring flange thereon adapted to rest on the activation side of the mounting part when the holding sleeve is fastened to the mounting part.

13. The mounting unit according to claim 1, wherein:
   the holding sleeve is adapted to be fastened to the mounting part such that it is completely surrounded by the throughbore of the mounting part; and
   the holding projections are configured such that, after being deformed in the radially inward direction for lockingly opposing a loosening of the fixing part with respect to the mounting part, they define a surface located approximately in a plane of the activation side of the mounting part.

14. The mounting unit according to claim 13, wherein the holding sleeve comprises a sheet metal cutting adapted to line circumferential walls of the throughbore of the mounting part.

15. The mounting unit according to claim 14, wherein the sheet metal cutting has side edges and is adapted to line the circumferential walls of the throughbore of the mounting part over an angle of 360° about a longitudinal axis of the throughbore such that its side edges abut one another.

16. The mounting unit according to claim 15, wherein the side edges of the sheet metal cutting are adapted to be enmeshed with one another.

17. The mounting unit according to claim 1, wherein the holding projections comprise nubs adapted to be axially impressed by the head of the fixing part thereby being plastically deformed after an insertion of the fixing part into the mounting part.

18. The mounting unit according to claim 1, wherein the holding sleeve has bead-shaped interlocking projections on a circumferential jacket thereof.

19. The mounting unit according to claim 1, wherein the head of the fixing part defines a concave notch on a supporting side thereof in a circumferential area of the shaft.

20. A method for producing the mounting unit according to claim 1, comprising the steps of:

fastening the holding sleeve to the mounting part;

inserting the fixing part with a fixing end thereof into the holding sleeve from the top end of the holding sleeve; and applying pressure to the holding projections in the insertion direction for deforming the holding projections such that they project into the undercutting space in a radially inward direction thereby lockingly opposing a loosening of the fixing part with respect to the mounting part.

21. The mounting unit according to claim 1, wherein the holding projections are configured for allowing an unhindered passage of the fixing part therethrough during its insertion into the mounting part, the holding projections further being adapted to be deformed such that they project into the undercutting space in a radially inward direction after an insertion of the fixing part into the mounting part thereby lockingly opposing a loosening of the fixing part with respect to the mounting part.

* * * * *